(12) United States Patent
Head

(10) Patent No.: US 9,572,328 B1
(45) Date of Patent: Feb. 21, 2017

(54) BAIT-FISH TRAP WITH FLOATING LIGHT

(71) Applicant: Clyde W Head, Granbury, TX (US)

(72) Inventor: Clyde W Head, Granbury, TX (US)

(*) Notice: Subject to any disclaimer, the term of this patent is extended or adjusted under 35 U.S.C. 154(b) by 0 days.

(21) Appl. No.: 14/839,938

(22) Filed: Aug. 29, 2015

Related U.S. Application Data

(63) Continuation-in-part of application No. 14/467,292, filed on Aug. 25, 2014, now Pat. No. 9,210,917, which is a continuation-in-part of application No. 13/533,274, filed on Jun. 26, 2012, now abandoned.

(60) Provisional application No. 61/526,417, filed on Aug. 23, 2011.

(51) Int. Cl.
*A01K 69/00* (2006.01)
*A01K 69/06* (2006.01)
*A01K 75/02* (2006.01)

(52) U.S. Cl.
CPC .............. *A01K 69/06* (2013.01); *A01K 75/02* (2013.01)

(58) Field of Classification Search
CPC ........ A01K 69/00; A01K 69/02; A01K 69/04; A01K 69/06; A01K 69/08; A01K 69/10; A01K 71/00; A01K 71/02; A01K 71/04; A01K 97/05
USPC .................................................. 43/100–103
See application file for complete search history.

(56) References Cited

U.S. PATENT DOCUMENTS

| | | | | | |
|---|---|---|---|---|---|
| 2,674,825 | A | * | 4/1954 | Rice | A01K 69/06 220/23.87 |
| 2,688,817 | A | * | 9/1954 | Brune | A01K 69/06 114/255 |
| 3,077,695 | A | * | 2/1963 | Winter | A01K 69/10 43/105 |
| 5,259,809 | A | * | 11/1993 | Rainey, Jr. | A01K 69/06 119/213 |
| D485,329 | S | * | 1/2004 | Haws | D22/136 |

* cited by examiner

Primary Examiner — Richard G Davis
(74) Attorney, Agent, or Firm — Kenneth L Tolar

(57) ABSTRACT

An improved bait-fish trap includes a cylindrical, mesh shell having a continuous outer wall, an upper end and an open lower end. The shell houses a mesh entrance cone having a lower base that is concentric with the open lower end of the shell, and an upper vertex in communication with an overlying entrapment chamber. At the upper end of the shell is a releasable hatch for accessing bait fish within the entrapment chamber. Attached to the hatch is a buoyant light for luring bait fish from the entrance cone into the entrapment chamber until they are removed via the releasable hatch. A buoyant tube is circumferentially secured to the inner surface of the upper end so that the shell remains afloat whenever the hatch is opened to retrieve captured bait fish.

2 Claims, 2 Drawing Sheets

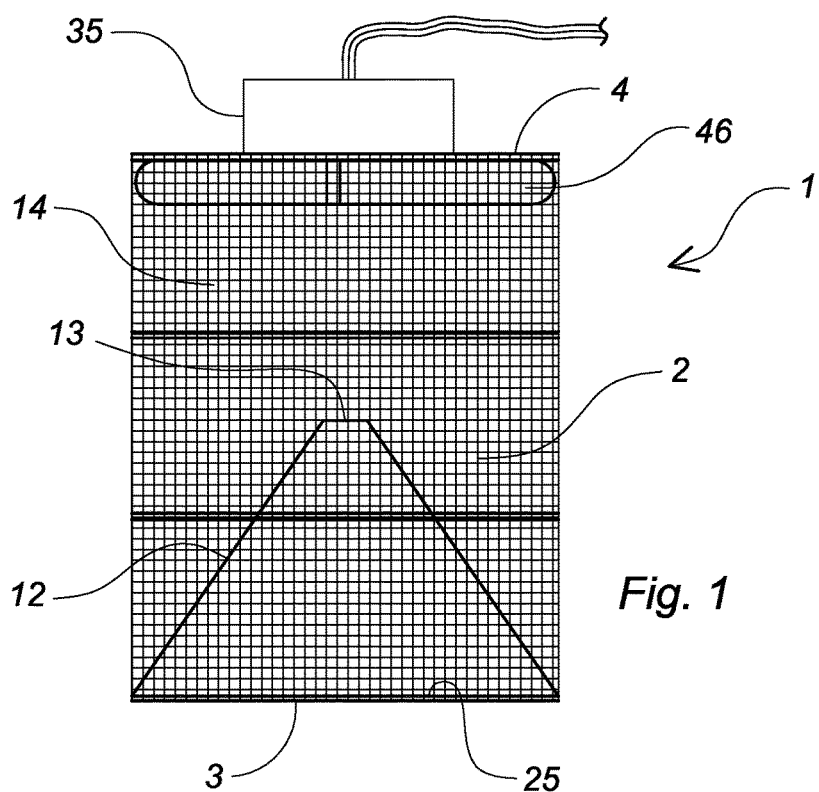
Fig. 1
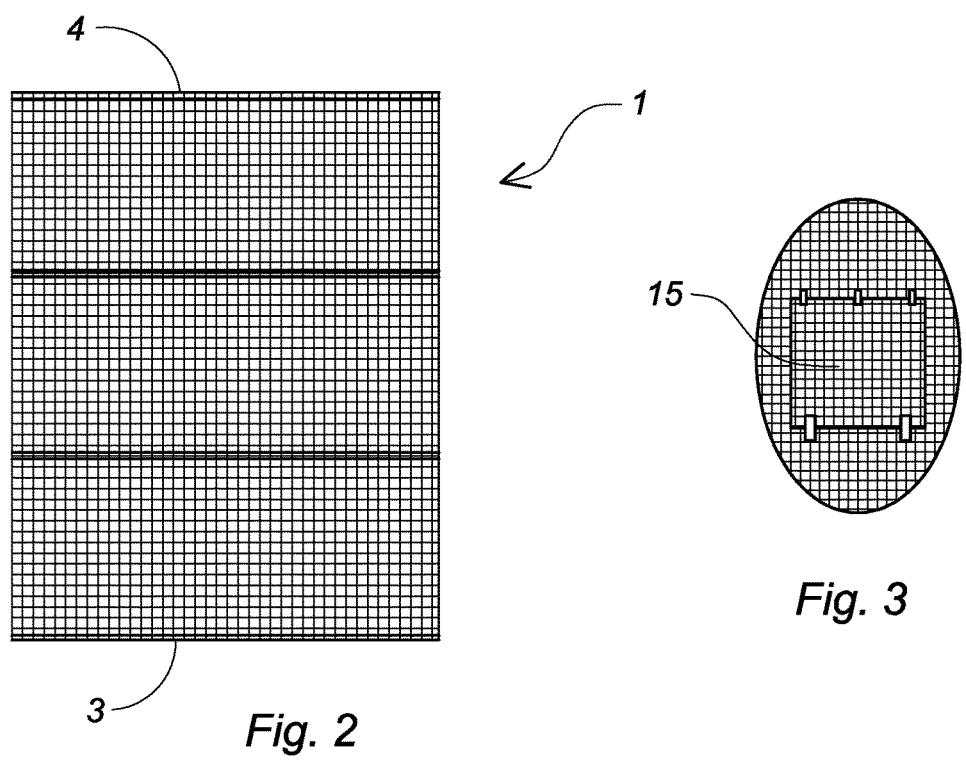
Fig. 2
Fig. 3

BAIT-FISH TRAP WITH FLOATING LIGHT

CROSS REFERENCE TO RELATED APPLICATIONS

This application is a continuation-in-part of application Ser. No. 14/467,292 filed on Aug. 25, 2014 and application Ser. No. 13/533,274 filed on Jun. 26, 2012, now abandoned, both of which claimed the benefit of provisional application No. 61/526,417 filed on Aug. 23, 2011, the specifications of which are all hereby incorporated by reference.

BACKGROUND OF THE INVENTION

The present invention relates to a trap having a buoyant light for luring bait fish into an entrapment zone.

DESCRIPTION OF THE PRIOR ART

Minnows and similar bait fish are difficult to capture with ordinary fish nets. Using a seine requires at least two people to wade into a body of water, which is laborious and perilous. Although a myriad of bait-fish traps exist in the prior art, they are laborious to use and rarely effective. Accordingly, there is currently a need for a trap that allows a user to easily capture bait fish. The present invention addresses this need by providing a trap having a buoyant light module at an upper end that lures bait fish through an entrance cone at a lower end and into an entrapment chamber.

SUMMARY OF THE INVENTION

The present invention relates to an improved bait-fish trap including a cylindrical, mesh shell having a continuous outer wall, an upper end and an open lower end. The shell houses a mesh entrance cone having a lower base that is concentric with the open lower end of the shell, and an upper vertex in communication with an overlying entrapment chamber. At the upper end of the shell is a releasable hatch for accessing bait fish within the entrapment chamber. Attached to the hatch is a buoyant light for luring bait fish from the entrance cone into the entrapment chamber until they are removed via the releasable hatch. A buoyant tube is circumferentially secured to the inner surface of the upper end so that the shell remains afloat whenever the hatch is opened to retrieve captured bait fish.

It is therefore an object of the present invention to provide an improved bait-fish trap.

It is another object of the present invention to provide a bait-fish trap having an integral, buoyant light module for keeping the trap afloat while attracting bait fish. Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a front, plan view of the bait-fish trap according to the present invention.

FIG. 2 is an isolated, plan view of the shell.

FIG. 3 is a top, sectional view of the shell.

DESCRIPTION OF THE PREFERRED EMBODIMENT

Figure 4:
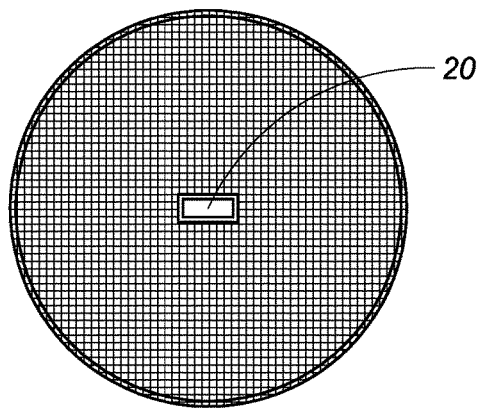
FIG. 4 is an isolated, top view of the entrance cone.
Figure 5:
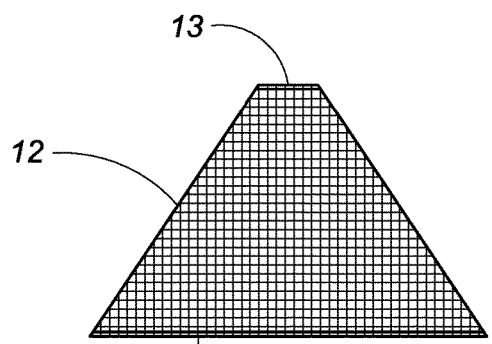
FIG. 5 is a isolated, front view of the entrance cone.
Figure 6:
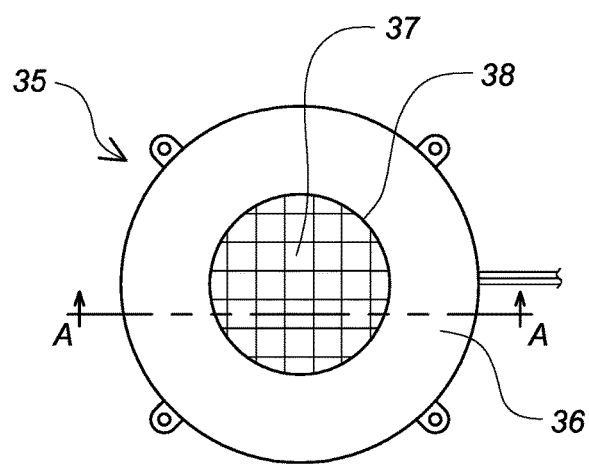
FIG. 6 is an isolated, bottom view of the buoyant light module.
Figure 7:
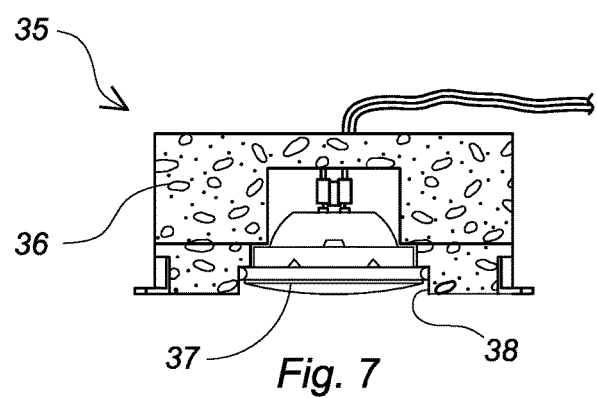
FIG. 7 is a front, sectional view of the buoyant light module.

The present invention relates to an improved bait-fish trap comprising a cylindrical shell 1 having a continuous outer wall 2, an open lower end 3 and a circular upper end 4. The shell is constructed entirely with a wire mesh having openings that are dimensioned to allow smaller, useless minnows to escape.

At the lower end of the shell is an entrance cone 12 that is likewise constructed with wire mesh. The cone includes a lower base 25 that is concentric with the open lower end 3 of the shell, and an upper vertex 13 having an aperture 20 in communication with an overlying entrapment chamber 14. The entrance cone funnels bait fish upwardly toward the vertex aperture 20; the resulting increase in fish density near the vertex discourages the fish from swimming back toward the entrance cone. Furthermore, once in the entrapment chamber, the bait fish are unlikely to locate the opening and return to the entrance cone.

At the upper end of the shell is a releasable hatch 15 for removing bait fish from the entrapment chamber. Attached to the hatch is a buoyant light module 35 that lures bait fish into the entrance cone while maintaining the shell afloat and upright. The light module includes a cylindrical, foam casing 36 having a light 37 embedded therein that projects a light beam through a lower opening 38 and into the entrapment zone. The foam casing assures that the shell floats in a vertical, upright orientation whenever the release hatch is properly secured. Circumferentially attached to the inner surface of the shell, proximal the upper end, is an annular, buoyant tube 46 for maintaining the shell afloat whenever the hatch is opened to access bait fish.

Accordingly, to use the trap according to the present invention, a fisherman immerses the shell in water and activates the light using a portable power source. Once nearby bait fish are lured into the entrance cone, they will attempt to access the light by swimming through the vertex aperture and into the entrapment chamber. The light and the minuscule vertex opening keep the trapped minnows within the entrapment chamber until they are removed via the releasable hatch. Furthermore, the circumferential tube maintains the shell afloat while the hatch is opened to allow the fisherman to retrieve bait fish without sinking the shell.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An improved bait-fish trap comprising:
   a cylindrical shell having a continuous outer wall, an upper end and an open lower end;
   an entrance zone within said shell that is accessible from the lower end;
   an entrapment chamber formed within said shell and segregated from said entrance zone;
   a passageway from said entrance zone to said entrapment chamber;

a releasable hatch at the upper end of said shell for removing bait fish from said entrapment chamber;

a buoyant light module attached to said releasable hatch for alluring bait fish to said entrance zone, through said passageway and into said entrapment chamber, and for maintaining said shell afloat upright in a body of water;

a tubular float circumferentially attached to the upper end of said shell for maintaining said shell afloat if said hatch is opened to access bait fish.

2. The improved bait-fish trap according to claim 1 wherein said buoyant light module includes a cylindrical, foam casing having a light embedded therein that projects a light beam through a lower opening and into the entrapment zone.

\* \* \* \* \*